(12) United States Patent
Zheng et al.

(10) Patent No.: US 9,322,287 B2
(45) Date of Patent: Apr. 26, 2016

(54) BRUSH SEAL FOR TURBINE

(71) Applicant: General Electric Company, Schenectady, NY (US)

(72) Inventors: Xiaoqing Zheng, Niskayuna, NY (US); Michael Dennis Mack, Ballston Spa, NY (US); Debabrata Mukhopadhyay, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/294,812

(22) Filed: Jun. 3, 2014

(65) Prior Publication Data

US 2015/0345318 A1 Dec. 3, 2015

(51) Int. Cl.
*F16J 15/32* (2006.01)
*F01D 11/02* (2006.01)
*F01D 11/00* (2006.01)
*F04D 29/08* (2006.01)

(52) U.S. Cl.
CPC ............ *F01D 11/001* (2013.01); *F04D 29/083* (2013.01); *F16J 15/3288* (2013.01)

(58) Field of Classification Search
CPC .......................... F16J 15/3288; F01D 11/001
See application file for complete search history.

(56) References Cited

U.S. PATENT DOCUMENTS

| | | | |
|---|---|---|---|
| 5,201,530 A | 4/1993 | Kelch et al. | |
| 5,265,412 A | 11/1993 | Bagepalli et al. | |
| 5,335,920 A | 8/1994 | Tseng et al. | |
| 5,480,165 A | 1/1996 | Flower | |
| 5,630,590 A | 5/1997 | Bouchard et al. | |
| 5,961,125 A | 10/1999 | Wolfe et al. | |
| 5,961,279 A | 10/1999 | Ingistov | |
| 6,053,699 A | 4/2000 | Turnquist et al. | |
| 6,059,526 A * | 5/2000 | Mayr | 415/231 |
| 6,077,038 A | 6/2000 | Gail et al. | |
| 6,079,714 A | 6/2000 | Kemsley | |
| 6,105,966 A | 8/2000 | Turnquist et al. | |
| 6,131,910 A | 10/2000 | Bagepalli et al. | |
| 6,173,962 B1 | 1/2001 | Morrison et al. | |
| 6,206,629 B1 | 3/2001 | Reluzco et al. | |
| 6,299,824 B1 | 10/2001 | Mayr et al. | |
| 6,308,957 B1 | 10/2001 | Wright | |
| 6,352,263 B1 * | 3/2002 | Gail et al. | 277/355 |
| 6,402,157 B1 | 6/2002 | Zhou et al. | |
| 6,428,009 B2 | 8/2002 | Justak | |
| 6,457,719 B1 | 10/2002 | Fellenstein et al. | |
| 6,460,857 B1 | 10/2002 | Turnquist et al. | |

(Continued)

FOREIGN PATENT DOCUMENTS

| | | |
|---|---|---|
| EP | 0 816 726 | 1/1998 |
| EP | 2 554 879 | 4/2013 |

OTHER PUBLICATIONS

Search Report issued in GB Application No. 1304664.4, dated Jul. 19, 2013.

*Primary Examiner* — Gilbert Lee
(74) *Attorney, Agent, or Firm* — Nixon & Vanderhye P.C.

(57) ABSTRACT

A brush seal for a turbine including an annular layer of filaments having a generally L-shape including an axial portion of the filaments and a radial portion of filaments, wherein a first end of the filaments is at an end of the radial portion and faces a rotating component of the turbine and a second end region of the filaments is at an end of the axial portion of the filaments and is fastened to a stationary component of the turbine.

20 Claims, 4 Drawing Sheets

(56) References Cited

U.S. PATENT DOCUMENTS

| | | |
|---|---|---|
| 6,464,230 B1 | 10/2002 | Tong et al. |
| 6,648,334 B2 | 11/2003 | Inoue |
| 6,681,486 B2 * | 1/2004 | Flower .................. 29/889.2 |
| 6,695,314 B1 * | 2/2004 | Gail et al. .................. 277/355 |
| 6,739,592 B2 | 5/2004 | Kono |
| 6,764,078 B2 | 7/2004 | Inoue |
| 6,951,339 B2 | 10/2005 | Turnquist et al. |
| 7,032,903 B1 | 4/2006 | Dalton et al. |
| 7,059,827 B1 | 6/2006 | Ingistov |
| 7,445,212 B2 | 11/2008 | Gail et al. |
| 7,516,962 B2 | 4/2009 | Boeck |
| 7,559,554 B2 | 7/2009 | Hogg et al. |
| 7,854,584 B2 | 12/2010 | Lusted et al. |
| 8,075,254 B2 | 12/2011 | Morgan et al. |
| 8,181,965 B2 | 5/2012 | Addis |
| 8,235,392 B2 * | 8/2012 | Gail et al. .................. 277/355 |
| 8,328,198 B2 | 12/2012 | Adis et al. |
| 2001/0030397 A1 * | 10/2001 | Beichl .................. 277/355 |
| 2004/0217549 A1 | 11/2004 | Justak |
| 2005/0017458 A1 | 1/2005 | Turnquist et al. |
| 2005/0151324 A1 * | 7/2005 | Plona et al. .................. 277/355 |
| 2006/0055118 A1 * | 3/2006 | Beichl .................. 277/346 |
| 2007/0114727 A1 | 5/2007 | Greif et al. |
| 2007/0257445 A1 | 11/2007 | Mortzheim et al. |
| 2008/0296846 A1 | 12/2008 | Daggett et al. |
| 2010/0068042 A1 | 3/2010 | Bruck et al. |
| 2010/0078893 A1 | 4/2010 | Turnquist et al. |
| 2010/0201073 A1 | 8/2010 | Adis et al. |
| 2010/0270747 A1 | 10/2010 | Ghasripoor et al. |
| 2011/0156359 A1 | 6/2011 | Zheng et al. |
| 2011/0204573 A1 | 8/2011 | Zheng et al. |
| 2011/0272891 A1 | 11/2011 | Adis et al. |
| 2011/0285090 A1 | 11/2011 | Zheng |
| 2012/0086172 A1 | 4/2012 | Zheng et al. |
| 2012/0177484 A1 | 7/2012 | Lusted et al. |
| 2012/0326392 A1 * | 12/2012 | Zheng et al. .................. 277/355 |
| 2012/0326393 A1 * | 12/2012 | Zheng et al. .................. 277/355 |
| 2013/0033008 A1 | 2/2013 | Martin et al. |
| 2013/0256992 A1 | 10/2013 | Zheng et al. |

* cited by examiner

_(US 9,322,287 B2)_

BRUSH SEAL FOR TURBINE

BACKGROUND OF THE INVENTION

The invention relates to brush seals that prevent gas leakage in a turbine.

Turbines convert thermodynamic energy from fluids, such as pressurized steam, compressed air and combustion gases, into work such as to drive a generator to produce electricity. The work is performed as the fluids flow through rows of blades (also referred to as buckets) mounted on turbine wheels. The force of the fluids on the blades turns the wheels and the shaft on which the wheels are mounted. Fluids must flow over the blades to turn the wheels and the rotor shaft. Fluids that leak into the turbine casing or otherwise do not pass over the blades do not turn the shaft and reduce the efficiency of the turbine.

To confine the fluids to the blades, seals are positioned between the stationary and rotating components of a turbine. Sealing the gaps between the stationary and rotating components is challenging due to the high temperatures and pressures of the gases flowing through the turbine. Labyrinth, honeycomb and brush seals are known types of seals for the gaps between the stationary and rotating components of an axial turbine. Brush seals are the focus of this disclosure.

A brush seal is typically arranged annularly around a rotating component of the turbine. The brush seal includes thousands of densely packed wire filaments (bristles). One end of the filaments are clamped between or welded to annular metal plates that are attached to a stationary component of the turbine. The filaments extend radially and span a gap between the stationary component and a rotating component. The tips of the filaments touch and brush against the rotating component. The closely packed filaments form a seal that prevents fluids from leaking through the gap bridged by the brush seal and between the rotating and stationary components.

Brush seals have conventionally been difficult to place where there is only a narrow space between the stationary and rotating components. The filaments in a brush seal have a length in a radial direction with respect to the turbine. A portion of the length of the filaments is needed for the annular clamp plates. The radial dimensions of the filaments and the annular clamp of a conventional brush seal do not easily fit in a narrow space between the stationary and rotating components.

BRIEF SUMMARY OF THE INVENTION

Brush seals have been conceived and are disclosed herein that include wire filaments selected to withstand the gas pressures and other conditions of a turbine, such as a steam or gas turbine. The filaments are arranged in layers, such as at least one layer of thick (large diameter) filaments and a layer of thin (small diameter) filaments. The layers of filament are arranged in an L-shape such that a portion, e.g., a major portion, of the layer is oriented substantially parallel to the rotor shaft axis. A bend in each layer turns the layer to a radial direction such that the ends of the filaments abut or nearly abut a rotating surface of the turbine. The opposite ends of the brush seal are clamped or welded between a pair of annular side rails. The side rails, with the filaments, are attached to the casing of the turbine or the inner cover of a nozzle. An axially, annular slot for the L-shaped brush seals is formed in the nozzle inner cover or tube casing. The slot may be formed between a radially inward surface of the nozzle inner cover or the casing and an annular support ring.

A brush seal has been conceived and is disclosed herein for a turbine including an annular layer of filaments having a generally L-shape including an axial portion of the filaments and a radial portion of filaments, wherein a first end of the filaments is at an end of the radial portion and faces a rotating component of the turbine and a second end region of the filaments is at an end of the axial portion of the filaments and is configured to be fastened to a stationary component of the turbine.

A brush seal assembly has been conceived and is disclosed herein for a turbine having a rotating axis, the brush seal assembly comprising: an annular layer of filaments having a generally L-shape including an axial portion of the filaments extending in a direction substantially parallel to the rotating axis and a radial portion extending in a direction substantially perpendicular to the rotating axis, wherein a first end of the filaments is at an end of the radial portion and faces a rotating component of the turbine and a second end region of the filaments is configured to be fastened to a stationary component of the turbine, and an annular support ring fixed to a stationary component of the turbine. A slot for the brush seal includes annular surface extending substantially axially, a substantially radially extending radial surface and a corner between the axial and radial surfaces, wherein the axial annular surface supports the axial portion of the filaments and the radial surface supports the radial portion of the filaments.

A brush seal assembly has been conceived and is disclosed herein for a turbine having a rotating axis, the brush seal assembly comprising: an annular layer of filaments and at least one annular protection sheet on one or both of the outer surfaces of the layer of filaments. The layer of filaments and the protection sheet have a generally L-shape including an axial portion extending parallel to the axis of the rotor and a radial portion extending in a direction substantially perpendicular to the axis. A first end of the filaments and protection sheet is at an end of the radial portion and faces a rotating component of the turbine. A second end region of the filaments and protection sheet is at an end of the axial portion and is seated in a stationary slot.

DETAILED DESCRIPTION OF THE INVENTION

Figure 1:
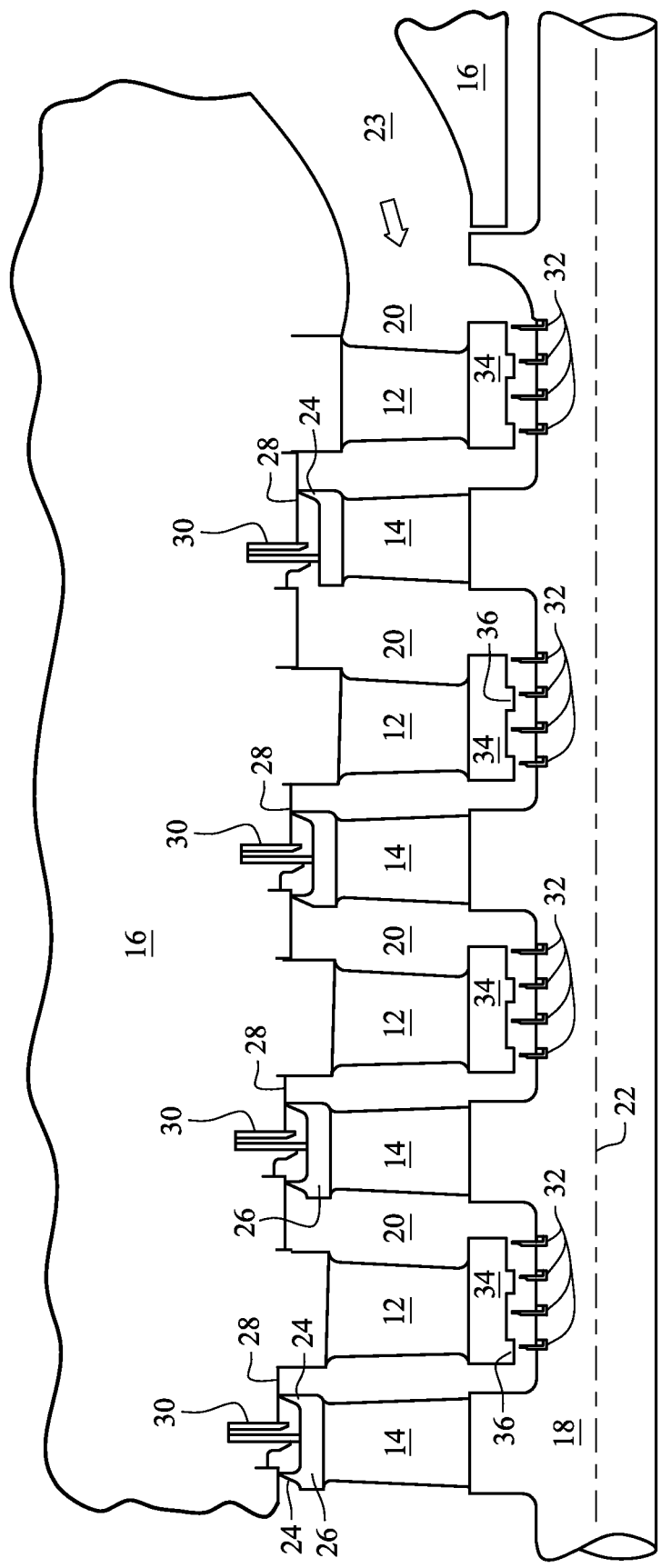
FIG. 1 is a cross-sectional view of the gas path through a conventional axial turbine having brush seals between the casing and the turbine blades.

FIG. 1 shows a conventional axial turbine 10 including stationary nozzles 12 (which may also be referred to as vanes) and rotating buckets 14 (which may also be referred to as turbine blades). The axial turbine 10 may be a steam turbine including a stationary annular casing 16 that houses turbine buckets mounted to wheels fitted to a rotor shaft 18. An annular steam gas passage 20 is formed between the casing 16 and the rotor shaft or wheels 18. The nozzles 12 and buckets 14 extend into the gas passage 20. The nozzles 12 are stationary and attached to the casing 16. The nozzles 12 are arranged in rows positioned along the length of the gas passage 20. The buckets 14 are attached to and rotate with the rotor shaft and wheels 18 about an axis 22. The buckets are arranged in annular rows positioned along the length of the gas passage 20. The rows of buckets alternate with the rows of nozzles, along the axis 22 of the rotor shaft.

The steam gas path passage 20 includes an annular inlet 23 into which steam (or other gas) enters turbine 10. As it moves through the passage 20, steam is directed by each row of nozzles into the row of buckets immediately downstream of the row of nozzles. The force of the steam on the buckets rotates the rotor shaft. The work performed by the steam on the buckets and rotor shaft is used to drive electrical generators or other types of machines.

Steam is confined to the gas passage 20 to direct all of the steam against the buckets 12. Steam leakage occurs when steam escapes the gas passage 20 and flows between the tips of the buckets and the casing or between the tips of the nozzles and the rotor shafts. Leaked steam does not perform useful work because the steam does not contribute to the rotation of the rotor shaft. Leaked steam reduces the efficiency of the turbine in converting energy in the steam to work.

Seals are traditionally arranged at the tips of the buckets and nozzles. Seals prevent gases form leaking from the gas passage 20 and into the casing. For example, annular tip seals 24, e.g. teeth or ridges, extend radially outward from an upper annular surface of a shroud 26 on the buckets 14. A tip seal 24 may be a rigid arcuate shaped ridge or tooth on the upper shroud surface. The upper shrouds 26 on a row of buckets form an annular ring around the row. The tip seals 24 on each of the shrouds in a row of buckets form an annular rigid seal that extends from the shrouds towards an annular inner surface 28 of the casing. The tip seal 24 does not contact the inner surface 28 of the casing as a small annual gap exists between the tip seal and the surface 28.

Conventional annular brush seals 30 have been used in conjunction with and adjacent to tip seals. The brush seal 30 is seated in a groove of the casing 16 and extends radially inward from the inner surface 28 of the casing to an outer surface of the shroud 26 on a row of buckets. The brush seal 28 includes filaments bundled together in an annular array. The bundle of filaments is clamped between annular clamp plates (side rails) that are seated in an annular groove in the casing. The tips of the filaments brush against the outer surface of the shroud 26 of the buckets 12.

Inner cover seals 32 may also arranged between the rotor shaft 18 and the inner cover sections 34 of each row of the nozzles 12. The tips of the annular inner cover seals 32 may brush against annular ridges 36 on the inner covers 34 of the nozzles. The inner cover seals 32 rotate with the rotor. The annular inner cover seals may include brush seals, similar to the brush seals 30 mounted to the casing.

The conventional brush seals 30 shown in FIG. 1 include filaments that extend radially inward along their entire lengths. The annular clamping plates that secure the filaments to the casing are also oriented radially. The large radial dimension of the conventional brush seal can render the seal unsuited for locations in the turbine that are narrow and lack sufficient radial space within which to seat the seal.

Figure 2:
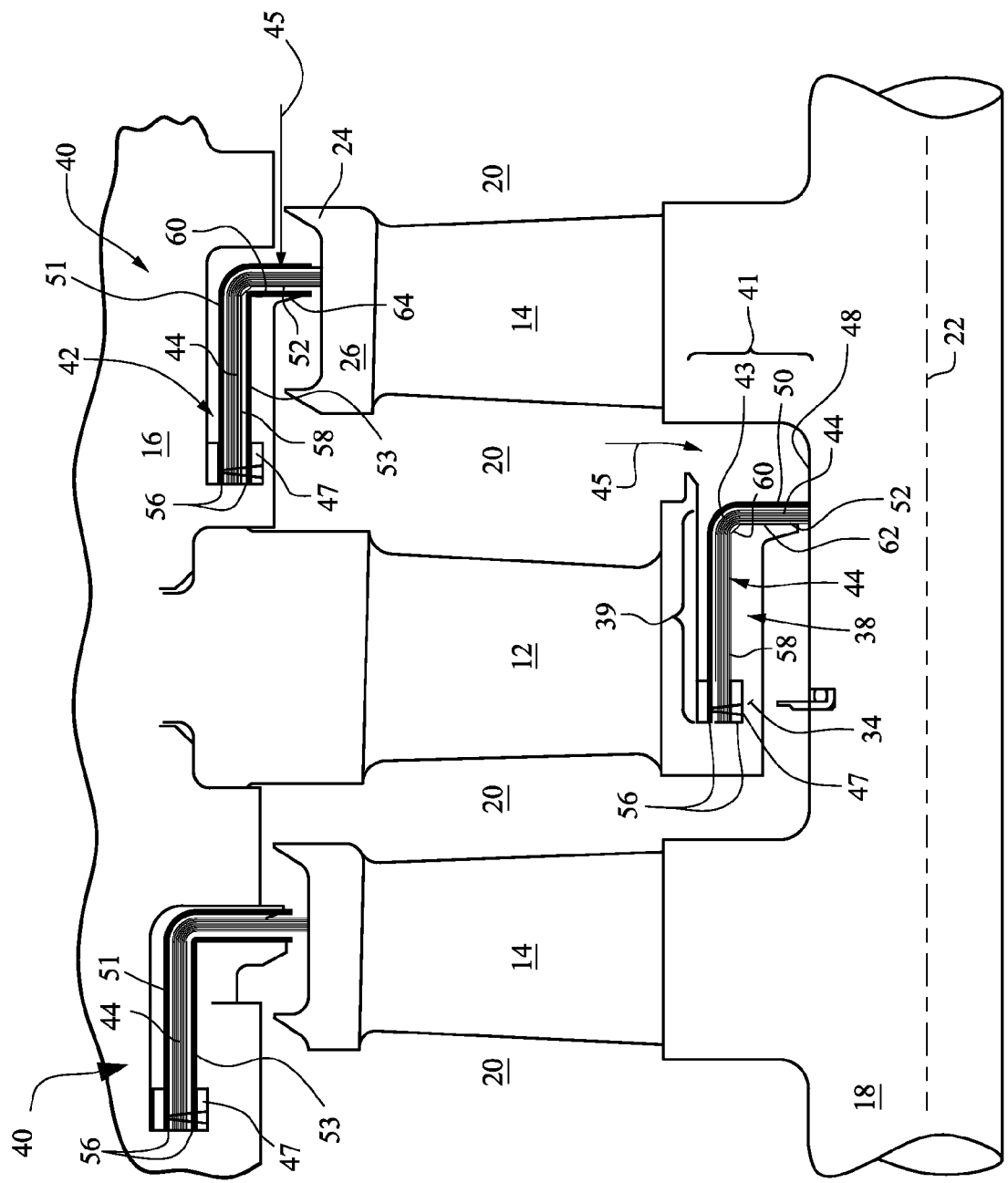
FIG. 2 is an enlarged cross-sectional view of a portion of an axial turbine having L-shaped brush seals between the casing and the turbine buckets and between the nozzles and the rotor.

FIG. 2 is a schematic diagram of an enlarged portion of an axial steam turbine showing a first embodiments of L-shaped brush seals 38, 40. The seals 38, 40 are L-shaped in cross-section. The L-shaped brush seals 40 are seated in an axially extending slot 42 in the casing 16. The brush seal 40 and has filaments 44 (wire bristles) that extend axially through the slot, turn and extend radially to the outer surface of the shroud 26 on a row of buckets 14. The L-shaped brush seal 38 is mounted to an axially extending slot 46 in the inner covers 34 of a row of nozzles 12. The L-shaped brush seal 38 has filaments 44 that extend axially through the slot 46, turns and extends radially to an outer surface 48 of the rotor shaft 18. The L-shaped brush seals 38, 40 each form an annulus. The seals 38, 40 may be a single annular component, a matching pair of half-circular sections or an annular array of arcuate sections.

The L-shaped brush seals 38, 40 have an axial portion 39 and a radial portion 41. The axial portion 39 is substantially parallel, e.g., within ten degrees, of the axis 22 of the rotor. The radial portion 41 is substantially perpendicular, e.g., within ten degrees, of the axis 22. The axial portion 39 may be at least as long as the radial portion and may have a length that is one and a half to two times the length of the radial portion. The brush seals 38, 40 may include a bend 43 between the axial and radial portions. The bend may be substantially ninety degrees (90°) such as in a range of about 85 to 95 degrees.

The filaments 44 of the brush seals 38 include an annular layer of thick wire filaments 50 and a second annular layer of thin wire filaments 52. The thick wire filaments may each have a diameter in a range of about 5.0 to 12.0 thousandths of an inch (0.13 millimeters to 0.3 mm) or 5.6 to 8.0 thousandths of an inch (0.14 mm to 0.20 mm). The thin wire filaments may each have a diameter in a range of about 2.0 to 5.0 thousandths of an inch (0.05 mm to 0.13 mm). The thin wire filaments may have a diameter that is, for example, fifty to ninety percent of the diameter of the thick wire filaments.

The individual filaments (bristles) may be formed of metallic or non-metallic wire. Metallic materials may include, for example, copper, steel and metal alloys. The metal alloys may include cobalt alloys and nickel alloys, such as Coa51Ni10Cr20W15Fe3*Mn15Si0.4*C0.10, where "a" refers to "as balance" and "*" refers to "maximum" and the numerals are in weight percent. Another example of a metal alloy is Ni57Co2.5Cr16Mo16W4Fe5Si0.08Mn1C0.01, where the numerals are in weight percent. The cobalt and nickel alloys may also include Haynes® 25 alloy and Hastelloy® C-276 alloy supplied by Haynes International, Inc. Non-metallic materials for the filaments may include para-aramid synthetic fibers (e.g., Kevlar® supplied by the E.I. du Pont de Nemours and Company), carbon fibers and combinations thereof.

The materials and diameters of the filaments are chosen depending on various factors and design considerations which depend on each application of the brush seal. These factors include the pressures, temperatures, corrosive gases and other conditions in which the brush seal will operate. The selection of the materials for the filaments may involve a trade-off among material properties such as stiffness, creep resistance, wear resistance, and chemical inertness against oil, for example. The diameters of the filaments, especially the thick wire filaments 50, may be selected to ensure structural stability against aerodynamic forces. The smaller diameters used in the thin wire filaments 52 are selected such that the layer of filaments has a desired effective clearance between filaments.

The layer of thick wire filaments 50 is arranged to face the steam (gas) flow 45 from the steam path 20. The brush seal with thick wire filaments is shown in the lower portion of FIG. 2 in the inner cover 34 of the nozzles. The layer of thin wire filaments 52 is immediately downstream (in the direction of the steam flow 45) of the thick wire filaments 50. The thin wire filaments 52 are shielded from the steam flow by the layer of thick wire filaments. The thick wire filaments form a relatively stiff annular barrier to the steam flow 45 due to the relatively large diameter of the thick wires. However, steam may leak through the layer of thick wire filaments. The layer of thin wire filaments 52 blocks steam that leaks through the layer of thick wire filaments 50.

Protective sheets 51 and 53 are an alternative to the thick wire filaments or may be used in conjunction with the thick wire filaments. An L-shaped brush seal 40 may have a single protective sheet, such as sheet 51, or a pair of sheets 51, 53 that sandwich the filaments. The protection sheets are shown in the upper portion of FIG. 2 in the brush seal 40 in the casing 16. An L-shaped brush seal with a protective sheet 51 and an L-shaped brush seal with thick wire filaments may be used in the same turbine as shown in FIG. 2. Similarly, the L-shaped brush seals in a turbine may be all seals with a protective sheet or all with thick wire filaments.

The protective sheets 51, 53 may be annular, half-annular or arcuate panels having an L-shaped cross section. The protective sheets may be metallic or non-metallic and formed of the same materials discussed about for forming the filament wires. The protective sheets may be thin and have a thickness in a range of about 5 to 12.0 thousandths of an inch (0.13 millimeters to 0.3 mm) or 5.6 to 8.0 thousandths of an inch (0.14 mm to 0.20 mm).

The protective sheets 51, 53 from outer and inner covers for the filaments, particularly the thin wire filaments, of the L-shaped brush seal 40. The filaments are sandwiched between the protective sheets 51,53. The protective sheets 51,53 include an axial portion extending parallel to the axis 22 of the rotor and that corresponds to the axial portion 39 of the seal. The protective sheets include a radial portion extending radial toward the axis 22. A blend in the protective sheets joins axial and radial portions of the sheet. The radial portion of the protective sheets may include radial slots to allow the sheet to be formed into an arcuate or annular shape.

The protective sheets 51, 53 form a shield over the filaments, especially the thin wire filaments. The outer protective sheet 51 may be seated over the layer of filaments such that the axial portion of the protective sheet is radially outward of the filaments and the radial portion is upstream (in the direction of steam flow 45) of the filaments. The outer protective sheet provides structural support for the wire filaments and shields the filaments from the hot gases of the gas stream 45. The inner protective sheet 53 includes an axial portion that is radially inward of the wire filaments and a radial portion that is downstream of the wire filaments. The inner protective sheet 53 provides structural support for the wire filaments, particularly for the radial portion of the filaments that tend to bend in a downstream direction due to the gas flow 45.

Ends of the axial portions of the protective sheets 51, 53 are clamped between the side rails 56. The ends of the filaments are sandwiched between the protective sheets and the side rails. End of the radial portions of the protective sheets 51, 53 are radially outward of the ends of the filaments so that the ends of the protective sheets do not touch the surface of the 48 of the upper shroud 26 or other rotating surface.

The side rails 56 may be opposing strips or plates of metal between which are sandwiched the ends of the filaments 44 and protective sheets. The side rails 56 may each form an annular ring, be formed of two half-circles of rails or be formed of an annular array of arcuate rails. The side rails 56 may be thin metal strips arranged as concentric rings, arranged along common radial lines, and be at the same axial position along the rotor shaft. The length of the side rails 56 may be oriented in an axial direction such that the rails present a wide flat surface to the ends of the filaments.

The ends of the filaments 44 may be cut ends or be ends formed by folding filaments such that a single wire forms two bristles in the brush seal. The filaments may be folded around a rod or wire within or adjacent the side rails. With the filaments between them, the side rails 56 may be welded together or fastened together with bolts, screws or other types of fasteners. For example, electronic discharge welding may be used to weld together the side rails 56 with the filaments between the rails.

The side rails 56, the filaments and protective sheets of the brush seals are seated in the slots 42, 46 in the turbine casing and in the inner covers of the nozzles. The annular slots 46 in the inner covers 34 of a row of the nozzle extend substantially axially, such as within ten degrees of parallel to the axis 22 of the rotor. Similarly, the annular slot 42 in the casing extents substantially axially, such as within ten degrees of parallel to the axis 22 of the rotor. Each annular slot 42, 46 may have a height that is approximately the same as or slightly narrower that the thickness of the side rails 56 with the filaments clamped between the rails. The length of the annular slots may each be approximately the same as or slightly longer than the axial portion 50 of the brush seal.

A closed end section 47 of each slot 42, 46 may include an expanded annular seat for the side rails 56 clamping the filaments. The end section 47 may include an annular groove or step in the slot to receive at least one of the side rails 56. The groove or step provides a support to securely hold the side rails and thus the brush seal in the slot 42, 46.

A radially inward surface 58 of each of the annular slots 42, 46 provides an axially extending surface for supporting the filaments 44 of the brush seal. The filaments, particularly the thin wire filaments 52, may rest directly on the radially inward surface of the slot. Similarly, a protective sheet may rest on the inward surface of the slot. The inward surface may be smooth or have narrow grooves extending axially to assist with aligning the filaments in an axial direction.

The radially inward surface 58 of each slot 42, 46, turns radially inward at a corner 60 in the casing 16 or in the inner covers 34 of a row of nozzles. The corner 60 extends between the radially inward surface 58 and a radially extending annular surface 62. The corner may be rounded or chambered and turn substantially ninety degrees, such as between 80 to 90 degrees, or may turn only up to 70 degrees if the radially extending surface is oblique to a radial line. The corner 60 provides a support for the filaments as they bend from the axial direction to the radial direction. The axial portion 39 of the filaments, especially the thin wire filaments, is supported by the annular surface 39. The thin filaments 44 may abut against the annular surface 62. The radial portion 41 of the filaments may be supported by the radial surface 62.

The radial surface 62 extends in a substantially radial direction, e.g., at an angle in a range of about 80 to 90 degrees, towards a rotating surface of the upper shroud 26 on a row of buckets or on the rotor shaft 18. The radial surface may be a sidewall of a tip seal 64 that extends radially inward beyond the flat surface of the inner cover 34 of the nozzles or of the casing 16. Extending the radial surface 62 by including the tip seal provides additional support for the filaments of the brush seal. The radial surface 62 serves as a back rest to the filaments, especially the thin wire filaments 52, that assists in preventing excessive bending of the filaments due to the steam flow 45 acting on the filaments.

The ends of the filaments 50, 52 may extend to or nearly to a surface that is rotating. The ends may brush against the rotating surface. The filaments form an annular seal that prevents gas flow 45 through the gap between the component supporting the seal, such as the gap between the casing or inner covers of a row of nozzle and the upper shroud of the buckets or the rotor shaft. The thin wire filaments form a more closely packed annular seal than does the thick wire filaments. The thin wire filaments block gases that may leak through the layer of thick wire filaments. The layers of thin and thick wire filaments forms and effective gas seal.

The thick wire filaments 50 are relatively stiff and unbending as they face the gas flow 45. The thin wire filaments 52 are immediately downstream (in the direction of gas flow 45) of the thick wire filaments. The thin wire filaments 52 are partially shielded from the gas flow and are not subjected to the same high unsteady gas forces applied to the thick filaments. The thin wire filaments and the thick wire filaments are supported by the radial surface 62 which assists in preventing excessive bending of the filaments. The brush seal 38, 40, may be arranged in a stationary portion of the turbine such as the casing and inner cover of the nozzles.

Figure 3:
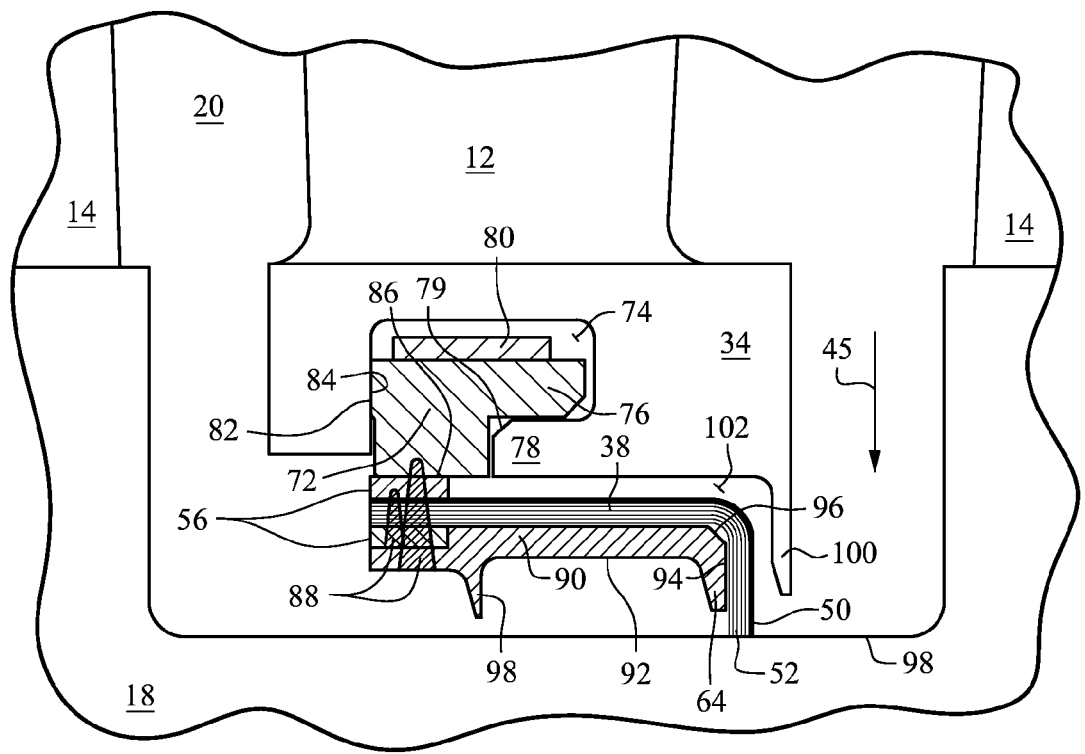
FIG. 3 is an enlarged cross-sectional view of a portion of an axial turbine having another embodiment of an L-shaped brush seal assembly extending between the nozzles and a turbine rotor.

FIG. 3 is a schematic diagram of an enlarged portion of an axial steam turbine showing a second embodiment of an assembly for an L-shaped brush seal 38. A brush seal mounting assembly 70 includes an annular ring 72 that seats in an annular opening 74 of the inner covers 34 of a row of nozzles 12. The annular ring may have a single annular structure, a mating pair of half-annular structures or an array of arcuate sections which are arranged in an array. The brush seal mounting assembly 70 may also be applied in a casing of a turbine and provide a gas seal between the casing and the turbine buckets 14.

The annular ring includes a nose 76 that engages a lip 78 in the inner covers 34. The lip may have a curved or chamfered corner 79 that faces a curved corner of the annular ring 72. A spring 80, e.g., a leaf or wave spring, biases the annular ring radially inward and against the lip 78. A radially oriented back wall 82 in the inner covers 34 provides a back rest that assists in retaining the annular ring 72 within the opening 74 of the inner covers 34. The annular ring 72 may have a bearing surface 84 that abuts the back wall 82. The bearing surface may be at a radial distance from the axis of the rotor that is at least as great as the radial distance of the lip 78 in the inner covers.

The side rails 56 clamp the filaments 50, 52 of the brush seal 38. The side rails 56 may have a single annulus structure, a mating pair of half-annular structures or an array of arcuate sections which are arranged in an annular array. The side rails may be welded together, such as by electron beam (EB) welding. The side rails may also be welded or otherwise fasten to a radially inward surface 86 of the inner cover 34 of a row of nozzles. To assist in fastening together the side rails 56 and the brush seal 38 to the annular ring 74, pins or EB welding pass 88 may extend through the side rails, the filaments and into the annular ring. The pins or teeth 88 may be welded or otherwise fastened to the side rails and the annular ring.

An annular support ring 90 is fastened to the brush seal 38 and to the annular ring 72 by the pins or by welding, e.g., electron beam welding, the ring 90 to the side rails 56 of the brush seal. The annular support ring 90 may have a single annular structure, a mating pair of half-annular structures or an array of arcuate sections which are arranged in an annular array. The annular support ring 72 provides an axially oriented support surface 92 and a radially oriented support surface 94. The support surfaces 92, 94, support the filaments 50, 52 of the brush seal. A chamfered or rounded corner 96 between the support surfaces 92, 94 allows for the rounded bend in the filaments. The axially oriented support surface 92 supports the axially extending portion of the filaments, and the radially oriented support surface 94 supports the radially extending portion of the filaments. The radially oriented support surface 94 may be an outer surface of a tip seal 64 that extends towards the rotating surface 98 of the rotor shaft 18 or other surface in which there is relative rotation between the brush seal and the surface. The annular support ring 90 may include a second tip seal 98.

The inner covers 34 of the nozzles may include an annular ridge or lip 100 extending radially inward. The ridge or lip covers the open end of a slot 102 for the brush seal. The slot 102 is formed between the inner covers 34 and the annular support ring 90. The ridge or lip 100 may extend radially inward beyond the slot 102 and provide shielding for a portion of the brush seal. The ridge or lip partially shields the slot and the brush filaments from direct impact from the gas flow 45.

Figure 4:
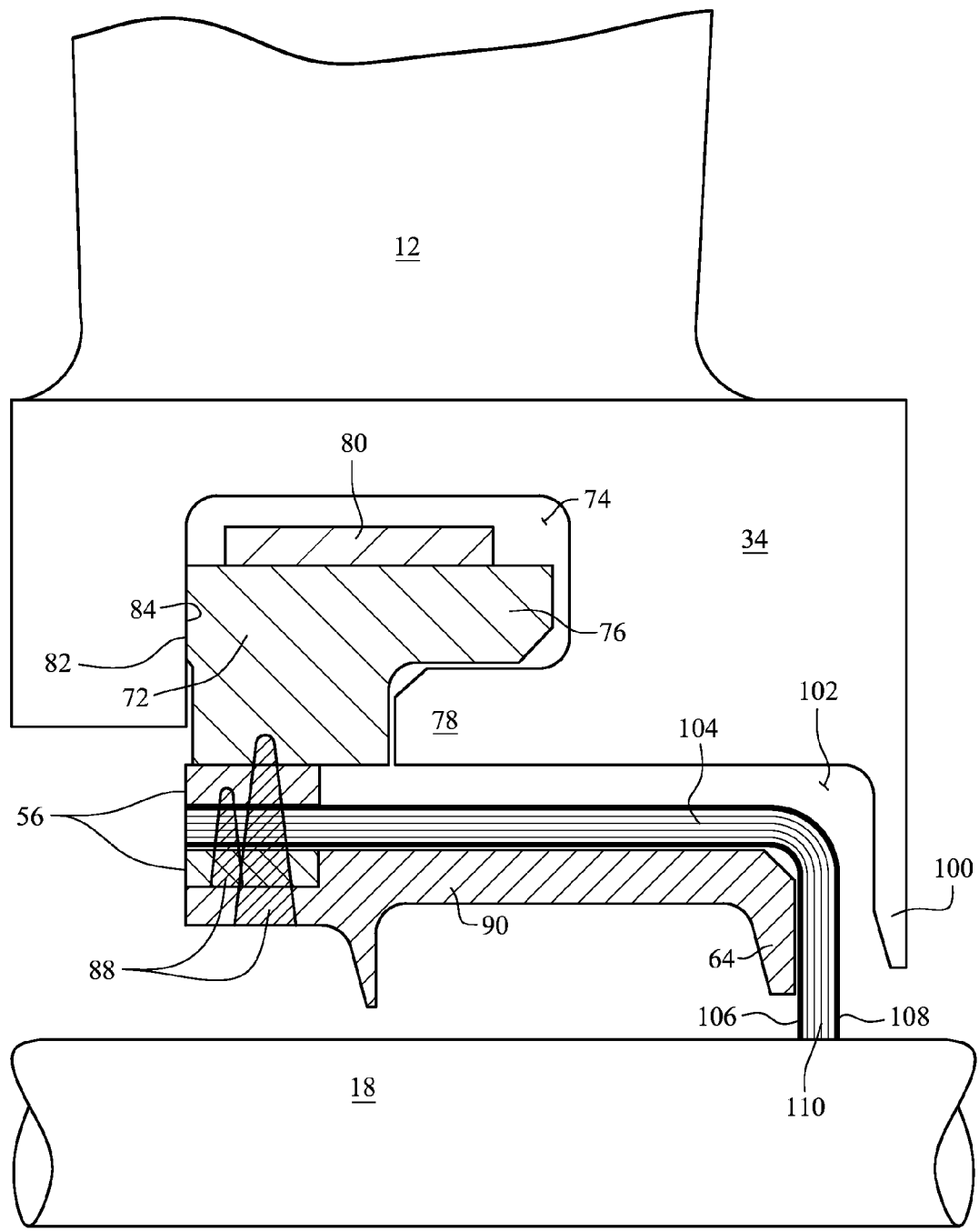
FIG. 4 is an enlarged cross-sectional view of a portion of an axial turbine having another embodiment of an L-shaped brush seal assembly extending between the nozzles and a turbine rotor.

FIG. 4 is a schematic diagram of an enlarged portion of an axial steam turbine showing another embodiment of a brush seal 104 that includes two layers 106, 108 of thick filaments. A layer 110 of thin wire filaments are sandwiched between the layers 106, 108 of thick wire filaments. The three layers 106, 108, 110 of filaments are bound between a pair of side rails 56. The layers form an L-shaped brush seal. Sandwiching the layer 110 of thin wire filaments between two layers of thick wire filaments 106, 108 provides additional structural support for the layer 110 of thin wire filaments. The downstream layer 106 of thick wire filaments provides support that prevents the thin wire filaments from bending and turning due to the pressure of the gas flow that passes through the up stream layer 108 of thick wire filaments.

The above discussion on orientation of filaments is in the axial-radial coordinate frame, the third direction, "circumferential", is implied whether the filaments extend substantially axial direction or the filaments extend substantially radial direction. In other words, filaments said to extend axially covers filaments extending substantially axially and tangentially but not radially. Filaments that are said to extend substantially radially include filaments extending substantially radially and tangentially but not axially.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A brush seal for a turbine having a rotating axis, the brush seal comprising:

an annular layer of filaments being L-shaped in cross section and including an axial portion of the filaments extending in a direction substantially parallel to the rotating axis and a radial portion extending in a direction substantially perpendicular to the rotating axis, wherein a first end of the filaments is at an end of the radial portion and faces a rotating component of the turbine and a second end region of the filaments includes an end of the axial portion of the filaments and is configured to be fastened to a stationary component of the turbine, and annular side rails which sandwiched the second end region of the filaments, wherein the side rails are coaxial and aligned along a common radius, and one of the annular side rails seats in a step or groove in a stationary annular structure which supports the filaments.

2. The brush seal of claim 1 wherein the annular layer of filaments includes a first layer of filaments and a second layer of filaments, wherein the filaments of the second layer have thinner diameters than the filaments of the first layer, and the second layer is radially inward of the first layer.

3. The brush seal of claim 2 wherein the diameters of the filaments in the first layer are in a range of 0.005 to 0.012 of an inch, and the diameters of the filaments of the second layer are in a range of 0.002 to 0.005 of an inch.

4. The brush seal of claim 2 wherein the annular layer of filaments further comprises a third layer of filaments having diameters thicker diameters than the filaments of the second layer, and the second layer of filaments is sandwiched between the first and third layers of filaments.

5. The brush seal of claim 4 wherein the diameters of the filaments in the third layer are in a range of 0.005 to 0.012 of an inch.

6. The brush seal of claim 1 further comprising further comprising an arcuate sheet adjacent the layer of filaments and the arcuate sheet being generally L-shape in cross section and including an axial portion and a radial portion.

7. The brush seal of claim 1 further comprising a pair of arcuate sheets each being L-shaped in cross section and including an axial portion and a radial portion, wherein the annular layer of filaments is sandwiched between the pair of arcuate sheets.

8. The brush seal of claim 1 wherein the axial portion of the filaments has a length dimension longer than a length dimension of the radial portion.

9. The brush seal of claim 1 wherein the filaments include a substantially 90 degree bend between the axial portion and the radial portion.

10. A brush seal for a turbine having a rotating axis, the brush seal comprising:
  an annular layer of filaments being L-shaped in cross section and including an axial portion of the filaments extending in a direction substantially parallel to the rotating axis and a radial portion extending in a direction substantially perpendicular to the rotating axis, wherein a first end of the filaments is at an end of the radial portion and faces a rotating component of the turbine and a second end region of the filaments is at an end of the axial portion of the filaments and is configured to be fastened to a stationary component of the turbine, and
  annular side rails between which are sandwiched the second end region of the filaments, wherein the side rails are coaxial and aligned along a common radius and the side rails are fastened together by pins or through welding extending radially through the side rails.

11. A brush seal assembly for a turbine having a rotating axis, the brush seal assembly comprising:
  an annular layer of filaments being generally L-shaped in cross section and including an axial portion of the filaments extending in a direction substantially parallel to the rotating axis and a radial portion extending in a direction substantially perpendicular to the rotating axis, wherein a first end of the filaments is at an end of the radial portion and faces a rotating component of the turbine and a second end region of the filaments includes an end of the axial portion of the filaments and is configured to be fastened to a stationary component of the turbine;
  an annular support integral or fixed to a stationary component of the turbine and including an axial annular support surface extending substantially axially, a substantially radially extending radial annular support surface and a corner between the axial and radial support surfaces, wherein the axial annular support surface supports the axial portion of the filaments, the axial annular support surface is radially inward of the filaments, and the radial annular support surface supports the radial portion of the filaments, and
  annular side rails between which sandwiched the second end region of the filaments, wherein the side rails are coaxial and aligned along a common radius and a radially inward side rail of the annular side rails is seated in an annular groove or step in the axial annular support surface.

12. The brush seal assembly of claim 11 wherein the annular support includes a tip seal extending radially inward and the radial surface is at a sidewall of the tip seal.

13. The brush seal assembly of claim 11 wherein the annular layer of filaments includes a first layer of filaments and a second layer of filaments, wherein the filaments of the second layer have thinner diameters than the filaments of the first layer, and the second layer is radially inward of the first layer.

14. The brush seal assembly of claim 13 wherein the annular layer of filaments further comprises a third layer of filaments having diameters thicker diameters than the filaments of the second layer, and the second layer of filaments is sandwiched between the first and third layers of filaments.

15. The brush seal assembly of claim 11 further comprising an arcuate sheet adjacent the layer of filaments and the arcuate sheet being generally L-shape in cross section and including an axial portion and a radial portion.

16. The brush seal assembly of claim 11 further comprising a pair of arcuate sheets each being L-shaped in cross section and including an axial portion and a radial portion, wherein the annular layer of filaments is sandwiched between the pair of arcuate sheets the axial annular support surface.

17. The brush seal assembly of claim 11 further comprising an annular support ring radially outward of the annular support, wherein the axial portion of the annular layer of filaments is between the annular support ring and the annular support, and the annular ring is seated in an annular opening in a stationary component of the turbine.

18. The brush seal assembly of claim 17 wherein the annular support includes a nose section extending axially over a lip in the annular opening and a bearing surface abutting a radially extending back wall of the annular opening.

19. The brush seal assembly of claim 17 further comprising a spring in the annular opening wherein the spring biases the annular support radially inwardly.

20. A brush seal assembly for a turbine having a rotating axis, the brush seal assembly comprising:
  an annular layer of filaments being generally L-shaped in cross section and including an axial portion of the filaments extending in a direction substantially parallel to the rotating axis and a radial portion extending in a direction substantially perpendicular to the rotating axis, wherein a first end of the filaments is at an end of the radial portion and faces a rotating component of the turbine and a second end region of the filaments is at an end of the axial portion of the filaments and is configured to be fastened to a stationary component of the turbine;
  an annular support ring fixed to a stationary component of the turbine and including an axial annular surface extending substantially axially, a substantially radially extending radial surface and a corner between the axial and radial surfaces, wherein the axial annular surface supports the axial portion of the filaments and the radial surface supports the radial portion of the filaments, and
  an annular ring radially outward of the annular support ring, wherein the axial portion of the annular layer of filaments is between the annular ring and the annular support ring, and the annular ring is seated in an annular opening in a stationary component of the turbine; and wherein the annular support ring, the filaments and the annular ring are fastened together by a pin or welding.

* * * * *

UNITED STATES PATENT AND TRADEMARK OFFICE
CERTIFICATE OF CORRECTION

PATENT NO. : 9,322,287 B2
APPLICATION NO. : 14/294812
DATED : April 26, 2016
INVENTOR(S) : Zheng et al.

Page 1 of 1

It is certified that error appears in the above-identified patent and that said Letters Patent is hereby corrected as shown below:

In the Specification:

Col. 5, line 26, change "from outer and inner covers" to --form outer and inner covers--

Col. 5, line 29, change "51,53" to --51, 53--

Col. 5, line 30, change "51,53" to --51, 53--

Col. 5, line 33, change "blend in the protective sheets" to --bend in the protective sheets--

Col. 7, line 6, change "forms and" to --form an--

Col. 8, lines 28-29, change "through the up stream layer" to --through the upstream layer--

In the Claims:

Claim 6, Col. 9, lines 16-17, delete second instance of "further comprising"

Claim 16, Col. 10, line 32, delete "the axial annular support surface"

Signed and Sealed this
Twenty-eighth Day of June, 2016

Michelle K. Lee
*Director of the United States Patent and Trademark Office*